(12) United States Patent
Keller

(10) Patent No.: US 9,951,802 B2
(45) Date of Patent: Apr. 24, 2018

(54) ASSEMBLY DEVICE

(71) Applicant: Adam John Keller, Fremont, WI (US)

(72) Inventor: Adam John Keller, Fremont, WI (US)

(73) Assignee: Adam John Keller, Fremont, WI (US)

( * ) Notice: Subject to any disclaimer, the term of this patent is extended or adjusted under 35 U.S.C. 154(b) by 447 days.

(21) Appl. No.: 14/875,827

(22) Filed: Oct. 6, 2015

(65) Prior Publication Data

US 2017/0097030 A1   Apr. 6, 2017

(51) Int. Cl.
| | | |
|---|---|---|
| *F16B 12/40* | (2006.01) | |
| *F16B 11/00* | (2006.01) | |
| *A01K 63/00* | (2017.01) | |
| *E06B 3/964* | (2006.01) | |

(52) U.S. Cl.
CPC .......... *F16B 11/006* (2013.01); *A01K 63/006* (2013.01); *E06B 3/9641* (2013.01); *E06B 3/9642* (2013.01); *F16B 11/008* (2013.01)

(58) Field of Classification Search
CPC .......... F16B 12/02; F16B 12/40; F16B 12/44; F16B 12/50; F16B 2012/145; F16B 2012/446; F16B 7/044; F16B 7/0446; Y10T 403/342; Y10T 403/347; A01K 63/00; A01K 63/003; A47B 47/0008; A47B 47/0016; E04B 1/1903; E04B 1/1912; E04B 2001/1915
See application file for complete search history.

(56) References Cited

U.S. PATENT DOCUMENTS

| | | | | |
|---|---|---|---|---|
| 3,103,374 | A | * 9/1963 | Portnoy | F16B 12/44 248/188 |
| 3,195,968 | A | * 7/1965 | Freeman | A47B 47/042 217/65 |
| 3,711,133 | A | 1/1973 | Werner | |
| 3,854,831 | A | 12/1974 | Gutner | |
| 4,299,508 | A | 11/1981 | Kerscher et al. | |

(Continued)

FOREIGN PATENT DOCUMENTS

| | | | | |
|---|---|---|---|---|
| CA | 2295716 | * | 1/1999 | ............ A47B 47/00 |
| DE | 102 09 121 | * | 1/2004 | ............ A01K 63/00 |

OTHER PUBLICATIONS

Rocky Mountian, Quick Frame Technical Data, 2014, 3 pages, Westmill Industries, Canada.

*Primary Examiner* — Michael P Ferguson
(74) *Attorney, Agent, or Firm* — Thomas J. Connolly; Northwind IP Law, S.C.

(57) ABSTRACT

An assembly device is disclosed for attaching first and second hollow frame members together. The assembly device includes a hollow base member having a top wall, four sidewalls and an open bottom surface. The base member also has a hollow tube positioned therein. The assembly device also includes first and second hollow coupling members projecting outward from a top wall and a side wall of said hollow base member. Each of the first and second coupling members has four sidewalls and one or more cavities formed therein. The cavities allow an expandable adhesive that is placed therein to contact the inner periphery of one of the first and second hollow frame members once the first and second hollow frame members are slid onto one of the first or second coupling members. The expandable adhesive will hold the first and second hollow frame members secure to the assembly device.

20 Claims, 3 Drawing Sheets

(56) References Cited

U.S. PATENT DOCUMENTS

| | | | |
|---|---|---|---|
| 4,323,319 A | 4/1982 | Adams | |
| 4,368,998 A * | 1/1983 | Pestoor | A47B 47/0008 403/171 |
| 4,516,376 A | 5/1985 | King | |
| 7,883,288 B2 | 2/2011 | Jorna | |
| 2009/0020669 A1 * | 1/2009 | Wang | A47B 43/04 248/220.1 |
| 2011/0017691 A1 * | 1/2011 | Wu | A47B 47/0008 211/153 |
| 2011/0241502 A1 * | 10/2011 | Kao | A47B 47/0008 312/111 |
| 2013/0008865 A1 * | 1/2013 | Su | A47B 87/0215 211/153 |

* cited by examiner

US 9,951,802 B2

ASSEMBLY DEVICE

FIELD OF THE INVENTION

This invention relates to an assembly device for securing a wheel to a frame or for securing two or more hollow frame members together.

BACKGROUND OF THE INVENTION

Various kinds, types and sizes of assembly devices exist. Such assembly devices are referred to by various names including: connectors, connecting members, assembly systems, corner connectors, etc. The assembly deices are advantageous in constructing the frame of various structures or for securing wheels, footpads, etc. onto a structure. The structures can include, but are not limited to: aquariums, animal cages, travelling carriers for animals, machinery safety cages, industrial security cages, boxes, window frames, door frames, frame members for furniture, coffee tables, partitions, etc. The assembly devices can be constructed from different materials such as plastic, aluminum, metal, a metal alloy, a composite material, fiberglass, wood, etc. The assembly device can be used to secure two or more hollow frame members together. The hollow frame members can vary in cross-section. For example, the cross-section could be square, rectangular, round or be of some other geometrical configuration. Commonly, the hollow frame members have a square cross-section when used to form the frame of an aquarium. The frame of an aquarium can support one or more panes of glass, PLEXIGLAS®, transparent panels, etc. PLEXIGLAS® is a registered trademark of Rohm and Haas Company having an office at Independence Mall, West Philadelphia, Pa. 19105. PLEXIGLAS® is a light transparent, weather-resistant thermoplastic. The hollow frame members are fastened together by one or more assembly devices using friction, adhesive, screws, etc. It is important that the assembly device provide adequate structural strength, durability and integrity. It is also advantageous to design the assembly device so that it can be injection molded in an economical fashion and that it exhibits the appropriate amount of strength to form a secure frame structure.

Currently, many assembly devices cannot be injection molded and require the use of one or more screws to provide both a secure and durable attachment. If an assembly device cannot be injection molded, it is usually more expensive to manufacture. Furthermore, if an assembly device requires the use of one or more screws, the finished product can be unsightly and its overall aesthetic appearance can be compromised.

Now, an assembly device has been invented which can be injection molded and which does not require any screws to provide a secure attachment.

SUMMARY OF THE INVENTION

Briefly, this invention relates to an assembly device for attachment to a hollow frame member having an inner periphery. The assembly device includes a hollow base member having a top wall, four sidewalls joined to the top wall, and having an open bottom surface. The hollow base member has a height and has a hollow tube positioned therein. The hollow tube extends parallel to the height. The hollow tube has an open bottom surface and the hollow tube is secured to at least one of the four sidewalls by a connecting member. The assembly device also includes a first hollow coupling member projecting upward from the top wall of the hollow base member and being integrally formed therewith. The first hollow coupling member has four sidewalls substantially coincident with the four sidewalls of the hollow base member. The four sidewalls create a hollow core in the first hollow coupling member which has a open upper end. At least one of the four sidewalls of the first hollow coupling member has a longitudinal groove formed there through. The longitudinal groove is aligned parallel to the height of the hollow base member and terminates at the open upper end. The longitudinal groove allows an expandable adhesive that is placed in the hollow core to pass there through and contact the inner periphery of the hollow frame member once the hollow frame member is slid onto the first hollow coupling member. The expandable adhesive will hold the hollow frame member secure to the assembly device.

An assembly device for securing first and second hollow frame members together is also taught. The assembly device includes a hollow base member having a top wall, four sidewalls joined to the top wall, and having an open bottom surface. The hollow base member has a height and has a hollow tube positioned therein which extends parallel to the height. The hollow tube has an open bottom surface, and the hollow tube is secured to at least one of the four sidewalls by a connecting member. The assembly device also includes a first hollow coupling member projecting upward from the top wall of the hollow base member and being integrally formed therewith. The first hollow coupling member has four sidewalls substantially coincident with the four sidewalls of the hollow base member. The four sidewalls create a hollow core in the first hollow coupling member which has a open upper end. At least one of the four sidewalls of the first hollow coupling member has a longitudinal groove formed there through. The longitudinal groove is aligned parallel to the height of the hollow base member and terminates at the open upper end. The longitudinal groove allows an expandable adhesive that is placed in the hollow core to pass there through and contact an inner periphery of the first hollow frame member. The expandable adhesive will hold the first hollow frame member secure to the assembly device. The assembly device further includes a second hollow coupling member having a pair a sidewalls formed integral with and projecting out from one of the four sidewalls of the hollow base member. The pair of sidewalls terminate at an end wall. The second hollow coupling member has a transverse partition aligned parallel with the end wall and integral with and connecting mid-portions of the pair of sidewalls. The pair of sidewalls extend to and terminate in parallel planes which are normal to the sidewall of the hollow base member. The transverse partition creates cavities into which an expandable adhesive can be placed and which can contact an inner periphery of the second hollow frame member and hold the second hollow frame member secure to the assembly device.

A combination of first and second hollow frame members and an assembly device is further taught. The combination includes a first hollow frame member having a top wall, a bottom wall and a pair of side walls joined to the top and bottom walls. The first hollow frame member has an inner periphery with a plurality of ribs longitudinally formed therein, and having a channel projecting upward from the top wall. The channel has an open top surface and open ends. The combination also includes a second hollow frame member having a top wall, a bottom wall and a pair of side walls joined to the top and bottom walls. The second hollow frame member has an inner periphery with a plurality of ribs longitudinally formed therein, and having a channel projecting upward from the top wall. The channel has an open top surface and open ends. The combination further includes an assembly device for securing the first and second hollow frame members together. The assembly device includes a hollow base member having a top wall, four sidewalls joined to the top wall, and having an open bottom surface. The hollow base member has a height and has a hollow tube positioned therein which extends parallel to the height. The hollow tube is secured to at least one of the four sidewalls by a connecting member. The hollow tube has an open bottom surface. A first hollow coupling member projecting upward from the top wall of the hollow base member and is integrally formed therewith. The first hollow coupling member has four sidewalls substantially coincident with the four sidewalls of the hollow base member. The four sidewalls create a hollow core in the first hollow coupling member which has a open upper end. At least one of the four sidewalls of the first hollow coupling member has a longitudinal groove formed there through. The longitudinal groove is aligned parallel to the height of the hollow base member and terminates at the open upper end. The longitudinal groove allows an expandable adhesive that is placed in the hollow core to pass there through and contact the inner periphery of the first hollow frame member once the first hollow frame member is slid onto the first hollow coupling member. The expandable adhesive will hold the first hollow frame member secure to the assembly device. The assembly device further includes a second hollow coupling member having a pair of sidewalls formed integral with and projecting out from one of the four sidewalls of the hollow base member. The pair of sidewalls terminate at an end wall. The second hollow coupling member has a transverse partition aligned parallel with the end wall and integral with and connecting mid-portions of the pair of sidewalls. The pair of sidewalls extend to and terminate in parallel planes which are normal to the sidewall of the hollow base member. The transverse partition creates cavities into which an expandable adhesive can be placed and which can contact an inner periphery of the second hollow frame member and hold the second hollow frame member secure to the assembly device.

The general object of this invention is to provide an assembly device for securing two hollow frame members together. A more specific object of this invention is to provide an assembly device which does not require screws to form a secure attachment with the two hollow frame members.

Another object of this invention is to provide an assembly device which can be injection molded and does not require the two hollow frame members to be notched.

A further object of this invention is to provide an assembly device which is relatively simply in configuration and can be manufactured at a reasonable cost.

Still another object of this invention is to provide an assembly device for securing first, second and third hollow frame members together.

Still further, an object of this invention is to provide a combination of first and second hollow frame members and an assembly device.

Other objects and advantages of the present invention will become more apparent to those skilled in the art in view of the following description and the accompanying drawings.

DETAILED DESCRIPTION OF THE INVENTION

Figure 1:
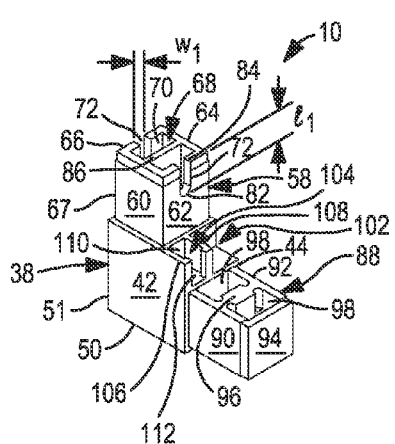
FIG. 1 is a perspective view of an assembly device.

Referring to FIG. 1, an assembly device 10 is shown for attachment to two hollow frame members 12, 12, see FIGS. 2-5. Each hollow frame member 12 has a top wall 14, a bottom wall 16 and a pair of side walls 18 and 20 joined to the top and bottom walls, 14 and 16 respectively. Each hollow frame member 12 has an inner periphery 22 with a plurality of ribs 24 longitudinally formed therein. The ribs 24 are spaced apart from one another and are relatively small in size having a height of less than about 0.15 inches. Desirably, the ribs 24 have a height of less than about 0.10 inches. A channel 26 projects upward from the top wall 14. The channel 26 has a pair of sidewalls 28 and 30, an open top surface 32 and open ends, 34 and 36. Each of the hollow frame members 12, 12 can vary in configuration but each is normally an elongated linear member. Likewise, the cross-section of each of the hollow frame members 12, 12 can vary. The cross-section of each of the hollow frame members 12, 12 can be square, rectangular, triangular, round, or be of some other geometrical shape. A square or rectangular cross-section is most common. Each hollow frame member 12 can be formed from any material known to those skilled in the art. For example, the hollow frame member 12 can be constructed from aluminum, plastic, a thermoplastic, a composite material, fiberglass, nylon, a metal, a metal alloy, steel, etc. By "nylon" it is meant any of a family of high-strength, resilient synthetic polymers containing recurring amide groups.

Figure 3:
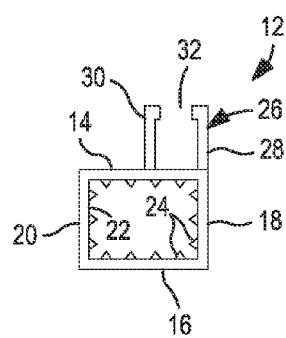
FIG. 3 is an end view of the hollow frame member shown in FIG. 2.
Figure 4:
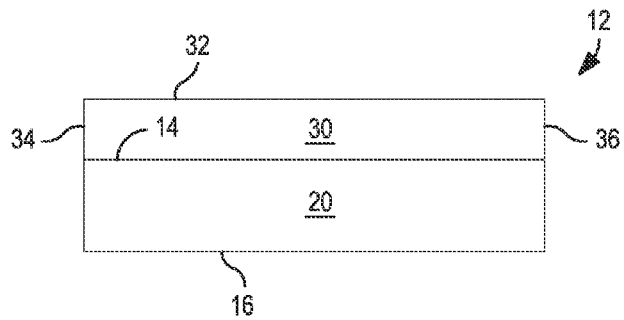
FIG. 4 is a back view of the hollow frame member shown in FIG. 2.
Figure 5:
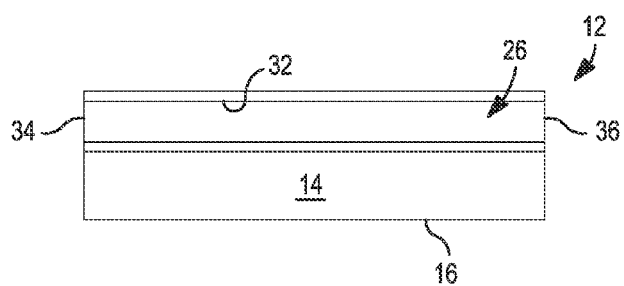
FIG. 5 is a top view of the hollow frame member shown in FIG. 2.

Referring again to FIGS. 1 and 6-10, the assembly device 10 has a hollow base member 38. The hollow base member 38 includes a top wall 40, four sidewalls 42, 44, 46 and 48 which are joined to the top wall 40, and has an open bottom surface 50. The hollow base member 38 has an outer periphery 51. The hollow base member 38 has a height h, see FIG. 8, which can vary in dimension. The hollow base member 38 has a hollow tube 52 positioned therein. The hollow tube 52 extends parallel to the height h. The hollow tube 52 has an open bottom surface 54. The hollow tube 52 is secured to at least one of the four sidewalls 42, 44, 46 and 48 by a connecting member 56. Four connecting members 56, 56, 56 and 56 are depicted in FIG. 3. One can utilize one, two, three or four connecting members 56.

The assembly device 10 can vary in size and shape. Typically, the assembly device 10 has a 3-dimensional shape. The 3-dimensional shape can appear as a square or a rectangular when viewed from the side. The assembly device 10 could be a cube, an L-shaped 3-dimensional member, a rectangular 3-dimensional member, etc. The assembly device 10 can be formed from any material known to those skilled in the art. For example, the assembly device 10 can be constructed from aluminum, plastic, a thermoplastic, a composite material, fiberglass, nylon, a metal, a metal alloy, steel, etc. Typically, the assembly device 10 is formed from the same or identical material as the hollow frame member 12. The assembly device 10 can also be made in any color. Black, gray or white are common colors.

Still referring to FIGS. 1 and 6-10, the assembly device 10 also includes a first hollow coupling member 58 projecting upward from the top wall 40 of the hollow base member 12. The first hollow coupling member 58 can be integrally formed with the hollow base member 12. The first hollow coupling member 58 has four sidewalls 60, 62, 64 and 66 which are substantially coincident with the four sidewalls 42, 44, 46 and 48 of the hollow base member 12, see FIG. 1. By "substantially coincident" it is meant being very similar to one another. The first hollow coupling member 58 has an outer periphery 67 which is smaller than the outer periphery 51 of the hollow base member 38. In other words, the outer periphery 51 of the hollow base member 38 is larger than the outer periphery 67 of the first hollow coupling member 58.

The four sidewalls 60, 62, 64 and 66 create a hollow core 68 in the first hollow coupling member 58. The hollow core 68 has an open upper end 70. At least one of the four sidewalls 60, 62, 64 and 66 of the first hollow coupling member 58 has a longitudinal groove 72 formed there through. The longitudinal groove 72 is aligned parallel to the height h of the hollow base member 12 and terminates at the open upper end 70. The longitudinal groove 72 allows an expandable adhesive 73 which is placed in the hollow core 68, see FIG. 7, to pass there through and contact the inner periphery 22 of the hollow frame member 12 once the hollow frame member 12 is slid onto the first hollow coupling member 58. The expandable adhesive 73 will hold the hollow frame member 12 secure to the assembly device 10.

In FIG. 1, two longitudinal grooves 72, 72 are depicted. The two longitudinal grooves 72, 72 are formed through two opposing sidewalls 62 and 66. It is felt, that as the expandable adhesive 73 expands outward, the expandable adhesive 73 will contact the two opposing sidewalls 18 and 20 of the hollow frame member 12 and provide a more positive attachment. It is also possible to form a longitudinal groove 72 in the third and fourth sidewalls 60 and 64, if desired.

Referring again to FIG. 8, the first hollow coupling member 58 has a height $h_1$ which can be greater than, equal to or be less than the height h of the hollow base member 38. Desirably, the height h of the hollow base member 38 is greater than the height $h_1$ of the first hollow coupling member 58.

The expandable adhesive 73 can vary and can be any expandable adhesive known to those skilled in the art. One commercially available expandable adhesive 73 is GORILLA GLUE® which is a registered trademark of Gorilla Glue Company having a mailing address of 4550 Red Bank Expressway, Cincinnati, Ohio 45227.

It should be understood that one could use a non-expandable adhesive, glue, a mechanical fastener, an interference fit, or simply pressure to secure the assembly device 10 to the two hollow frame members 12, 12.

Referring again to FIGS. 1 and 6-8, the first hollow coupling member 58 is depicted as having a rectangular shape although other shapes can also be utilized.

Figure 10:
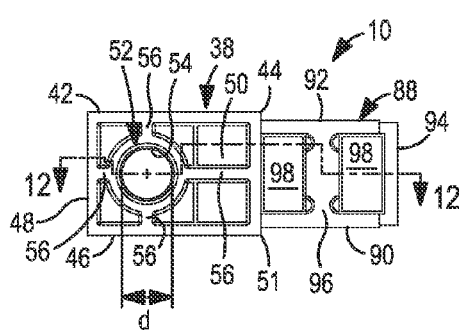
FIG. 10 is a bottom view of the assembly device shown in FIG. 1.
Figure 11:
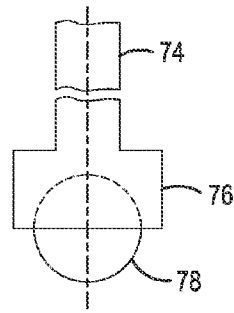
FIG. 11 is a side view of a stud and bracket housing a wheel wherein the stud can mate with the assembly device shown in FIG. 1.

Referring now to FIGS. 10 and 11, the open bottom surface 54 of the hollow tube 52 can vary in size and geometrical configuration. Desirably, the hollow tube 52 is circular having a diameter d of about 0.5 inches or less. A diameter d ranging from between about 0.25 inches to about 0.4 inches, works well. The hollow tube 52 is sized to receive a stud 74, see FIG. 11. By "stud" it is meant an upright post. The stud 74 can be connected to a bracket 76 which has a wheel 78 secured thereto. Alternatively, the stud 74 can be connected to a foot pad (not shown). The wheel 78 can vary in size, construction, shape and design. The wheel 78 can be a caster wheel. By "caster wheel" it is meant a small wheel on a swivel. Almost any other type of wheel 78 can also be used, if desired.

It should be understood that some other member, for example a foot pad (not shown), could also be secured to the stud 74, if desired.

The stud 74 can be locked into the hollow tube 52 by any means known to those skilled in the art. Alternatively, the stud 74 can be inserted into the hollow tube 52 and be held in place by friction and/or the weight of the object to which the assembly device 10 is attached.

Another option is to insert a stud 74, which is attached to some sort of anchor, into the hollow tube 52. This will allow the assembly device 10 to be attached to a stationary object, for example, a floor, a wall, a ceiling, etc.

Returning to FIG. 7, the top wall 40 of the hollow base member 38 also functions as a bottom wall 80 of the hollow core 68. The bottom wall 80 creates a definitive space in the hollow core 68. This means that only a set amount of an expandable adhesive 73 is needed to fill the hollow core 68. The expandable adhesive 73 will then be able to expand outwardly through the longitudinal groove 72 and also into the inner periphery 22 of the hollow frame member 12. By doing so, the expandable adhesive 73 will help secure the assembly device to the hollow frame member 12.

It should be understood that a secure, durable and snug fit between the assembly device 10 and the inner periphery 22 of the hollow frame member 12 can be facilitated by the plurality of ribs 24. The ribs 24 can act as teeth which engage with the outer periphery 67 of the first hollow coupling member 58. Other ways of ensuring that a tight fit is obtained is to size the outer periphery 67 of the first hollow coupling member 58 and the inner periphery 22 of the hollow frame member 12 to form an interference fit. A third option is to use some sort of interlocking mechanism between the two components. A fourth option is to apply an adhesive, such as glue, between the outer periphery 67 of the first hollow coupling member 58 and the inner periphery 22 of the hollow frame member 12. These and other ways of obtaining a secure fit are known to those skilled in the art.

Referring again to FIGS. 1 and 6-9, the overall shape of the longitudinal groove 72 can vary. The longitudinal groove 72 can be a long, narrow opening having a rounded end 82 and a free end 84. The free end 84 is located adjacent to the open upper end 70 of the first hollow coupling member 58. The longitudinal groove 72 has a length $l_1$ and a width $w_1$, see FIG. 1. The length $l_1$ and the width $w_1$ of the longitudinal groove 72 can vary depending upon the overall size of the assembly device 10. For an assembly device 10 having a length l and a width w, see FIG. 8, each being about 3 inches or less, the length $l_1$ of the longitudinal groove 72 can be about 1 inch or less. Desirably, the length $l_1$ of the longitudinal groove 72 is about 0.75 inches or less. More desirably, the length $l_1$ of the longitudinal groove 72 is about 0.5 inches or less. Likewise, the width $w_1$ of the longitudinal groove 72 for this size assembly device 10 can range from between about 0.1 inches to about 0.3 inches. Desirably, the width $w_1$ of the longitudinal groove 72 is less than about 0.25 inches.

Figure 2:
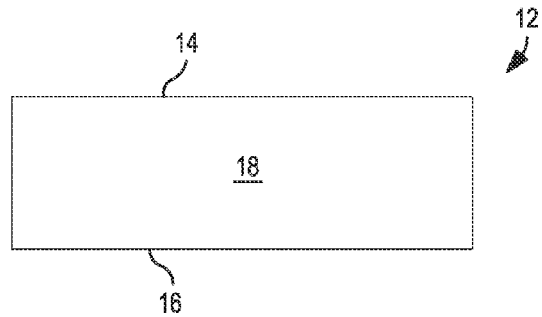
FIG. 2 is a front view of a hollow frame member.
Figure 8:
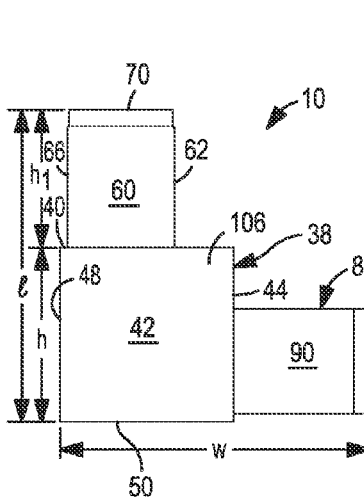
FIG. 8 is a front view of the assembly device shown in FIG. 1.
Figure 9:
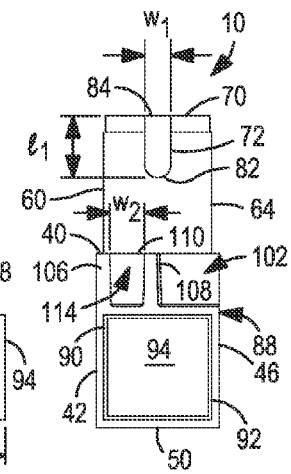
FIG. 9 is a right side view of the assembly device shown in FIG. 1.

Still referring to FIGS. 1 and 8, another way of expressing the length $l_1$ of the longitudinal groove 72 is to size it such that it is greater than, equal to or less than about half of the height $h_1$ of the first hollow coupling member 58, see FIG. 2. Desirably, the length $l_1$ of each of the longitudinal grooves 72, 72 is equal to or less than about half of the height $h_1$ of the first hollow coupling member 58.

Still referring to FIG. 1, one will notice a partition 86 formed in the hollow core 68. The partition 86 is aligned parallel to the sidewall 62 which contain the longitudinal groove 72. The partition 86 vertically divides the hollow core 68 in half. Alternatively, the partition 86 could divide the hollow core 68 into unequal portions. The partition 86 reduces the size of the hollow core 68 such that if only one longitudinal groove 72 was present, the expandable adhesive 73 would only be needed in that portion of the hollow core 68. This would reduce the amount of expandable adhesive 73 that would be needed to provide a secure attachment with the inner periphery 22 of the hollow frame member 12.

Referring again to FIGS. 1 and 6-10, the assembly device 10 also includes a second hollow coupling member 88 having a pair of sidewalls 90 and 92 formed integral with and projecting out from one of the four sidewalls 42, 44, 46 and 48 of the hollow base member 38. In FIG. 1, the second hollow coupling member 88 projects out from the sidewall 44. The pair of sidewalls 90 and 92 terminates at an end wall 94. The second hollow coupling member 88 has a transverse partition 96, see FIGS. 6, 7 and 10, which is aligned parallel with the end wall 94. The transverse partition 96 is integral with and connects mid-portions of the pair of sidewalls 90 and 92. The pair of sidewalls 90 and 92 extend to and terminate in parallel planes which are normal (at 90 degrees) to the sidewall 44 of the hollow base member 38. The transverse partition 96 creates cavities 98, 98 into which an expandable adhesive 73 can be placed. The cavities 98, 98 can vary in size and configuration. For simplicity sake, the expandable adhesive 73 is not shown in FIGS. 1, 6, 9 and 10. The expandable adhesive 73 can expand and contact an inner periphery 22 of a second hollow frame member 12 and hold the second hollow frame member 12 secure to the assembly device 10.

Referring again to FIG. 7, one will notice that four cavities 98, 98, 98 and 98 are formed in the second hollow coupling member 88. The four cavities 98, 98, 98 and 98 are formed by a second partition 100 which intersects the transverse partition 96. The second partition 100 can be horizontally aligned to the vertically aligned transverse partition 96 in the second hollow coupling member 88. The presence of the second partition 100 is optional.

Referring again to FIGS. 1 and 6-10, the hollow base member 38 of the assembly device 10 further includes a step configuration 102 located between the open bottom surface 50 and the top wall 40. A channel 104 is integrally formed on the step configuration 102 of the hollow base member 38. The channel 104 includes a pair of walls 106 and 108 aligned parallel to one another. The wall 106 is an extension of one of the four sidewalls 42, 44, 46 and 48. In FIGS. 1 and 6-10, the wall 106 is an extension of the sidewall 42 of the hollow base member 38. The other wall 108 is spaced apart from the wall 106 to create the channel 104. In this embodiment, the wall 108 is located in the middle of the step configuration 102, see FIG. 6.

Figure 6:
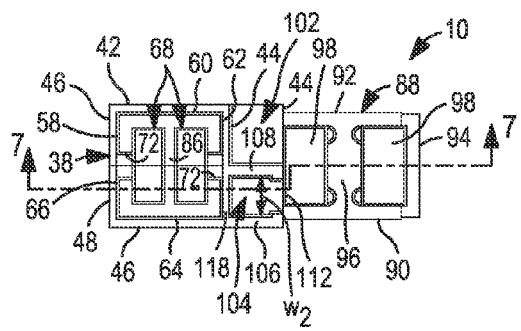
FIG. 6 is a top view of the assembly device shown in FIG. 1.

It should be understood that the channel 104 can be aligned flush with either the sidewall 42 or the sidewall 46 of the hollow base member 38. As depicted in FIG. 6, the wall 106 is flush with the sidewall 42. In the other instance, the wall 108 would be flush with the sidewall 46. When the wall 108 is flush with the sidewall 46, the wall 106 spaced apart from the wall 108 and is located in the middle of the step configuration 102. The channel 104 functions to allow a pane of glass, Plexiglas, a sheet of acrylic, or some other material to mate with the hollow frame members 12 and 12 without the need to notch, cut, bevel or miter a portion of the hollow frame members 12, 12 so that they can nest with the assembly device 10. In the past, manufacturers had to cut a portion of the end of each of the hollow frame members 12, 12 at a 45° angle so that they could nest into a corner bracket. The assembly device 10 does away with the need to form such a 45° angle on an end of a portion of each of the hollow frame members 12 and 12, thus saving time and expense.

Referring now to FIG. 6, the channel 104 has a width $w_2$ measured perpendicular to the step configuration 102. The width $w_2$ can vary in dimension. For example, the width $w_2$ can range from between about 0.2 inches to about 1.0 inch. Desirably, the width $w_2$ ranges from between about 0.25 inches to about 0.75 inches. More desirably, the width $w_2$ is less than about 0.5 inches. The width $w_2$ can be equal to about half of the width of the adjacent sidewall 44 of the hollow base member 38.

As best seen in FIG. 1, the channel 104 has an open top surface 110 and an open end 112 facing away from the hollow base member 38. The channel 104 is constructed to receive and hold a piece of glass, Plexiglas, a sheet of acrylic, transparent member or a non-transparent member. A non-transparent member could be a solid surface, such as a piece of plywood, metal, etc. By "a sheet of acrylic" it is meant a sheet formed from acrylic resin.

Figure 12:
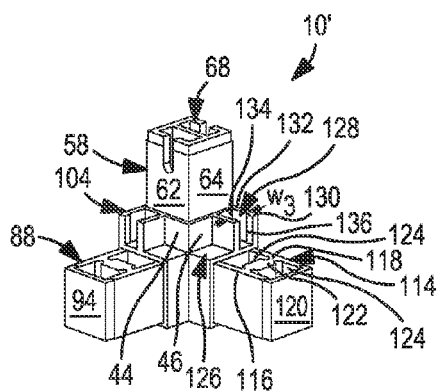
FIG. 12 is a perspective view of a second embodiment of an assembly device.

Referring now to FIG. 12, a second embodiment of an assembly device 10' is shown. The assembly device 10' is similar to the assembly device 10 except it contains additional structure for securing first, second and third hollow frame members 12, 12 and 12 together. Like components will be referred to using the same numbers as were used for the assembly device 10.

The assembly device 10' includes a third hollow coupling member 114 having a pair a sidewalls 116 and 118 formed integral with and projecting out from a second of the four sidewalls 42, 44, 46 and 48 of the hollow base member 38. The third hollow coupling member 114 is shown projecting out from the sidewall 46. The pair of sidewalls 116 and 118 terminates at an end wall 120. The third hollow coupling member 114 has a transverse partition 122 which is aligned parallel with the end wall 120. The transverse partition 122 is formed integral with and connects mid-portions of the pair of sidewalls 116 and 118. The pair of sidewalls 116 and 118 extend to and terminate in parallel planes which are normal (at 90 degrees) to the second sidewall 46 of the hollow base member 38. The transverse partition 122 creates two cavities 124, 124 into which an expandable adhesive 73 (not shown) can be placed. The expandable adhesive 73 can expand and contact an inner periphery 22 of a third hollow frame member 12 and hold the third hollow frame member 12 secure to the assembly device 10'. The size and shape of the cavities 124, 124 can vary.

Figure 7:
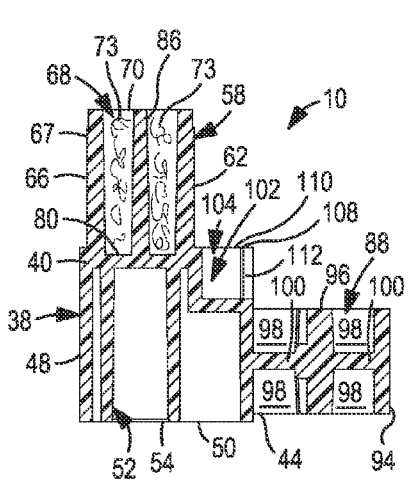
FIG. 7 is a vertical cross-sectional view of the assembly device shown in FIG. 6 taken along line 7-7.

The third hollow coupling member 114 can also include a second partition (not shown) which is identical to the second partition 100, shown in FIG. 7. The second partition would intersect with the transverse partition 122 and divide the third hollow coupling member 114 into four cavities 124, 124, 124 and 124. The second partition can be horizontally aligned to the vertically aligned transverse partition 122 in the third hollow coupling member 114. The presence of the second partition is optional.

It should be understood that the first, second and third hollow frame members 12, 12 and 12 are identical in construction and are as represented in FIGS. 2-5.

Still referring to FIG. 12, the hollow base member 38 of the assembly device 10' further includes a step configuration 126 located between the open bottom surface 50 and the top wall 40. A channel 128 is integrally formed on the step configuration 126 of the hollow base member 38. The channel 128 includes a pair of walls 130 and 132 aligned parallel to one another. The wall 130 is an extension of one of the four sidewalls 42, 44, 46 and 48. In FIG. 12, the wall 130 is an extension of the sidewall 46 of the hollow base member 38. The other wall 132 is spaced apart from the wall 130 to create the channel 128.

The channel 128 has a width $w_3$ measured perpendicular to the step configuration 126. The width $w_3$ can vary in dimension. For example, the width $w_3$ can range from between about 0.2 inches to about 1.0 inch. Desirably, the width $w_3$ ranges from between about 0.25 inches to about 0.75 inches. More desirably, the width $w_3$ is less than about 0.5 inches. The width $w_3$ can be equal to about half of the width of the adjacent sidewall 46 of the hollow base member 38.

The width $w_3$ of the channel 128 should be approximately equal to the width $w_2$ of the channel 104.

The channel 128 has an open top surface 134 and an open end 136 facing away from the hollow base member 38. The channel 128 is constructed to receive and hold a piece of glass, Plexiglas, a sheet of acrylic, a transparent member or a non-transparent member. However, a non-transparent member could also be secured to the channel 128. The channel 128 functions the same way as the channel 104 to allow a pane of glass, a sheet of acrylic, or some other material to mate with the frame members 12 and 12 without the need to notch, cut, bevel or miter a portion of the hollow frame members 12, 12 so that they can nest with the assembly device 10.

The third hollow coupling member 114 is aligned perpendicular to the second hollow coupling member 88 and lies in the same horizontal plane as the second hollow coupling member 88. Desirably, the third hollow coupling member 114 is aligned perpendicular to the first and second hollow coupling members, 58 and 88 respectively.

Still referring to FIG. 12, it should be understood that the channels 104 and 128 could be moved laterally so that they are located adjacent to the inner corner established by the sidewall 44 and 46, if desired. In this case, the piece of glass, Plexiglas, etc. would be flush with an inner surface of the assembly device 10', instead of being flush with an exterior surface thereof.

Figure 13:
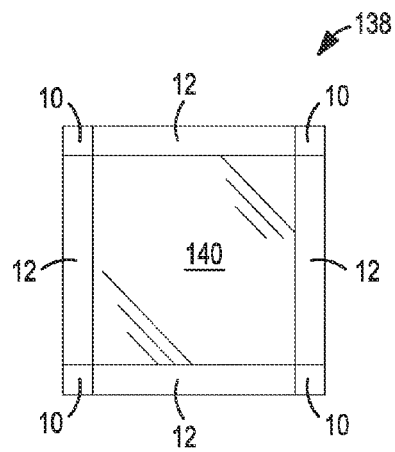
FIG. 13 is a front view of a frame including four hollow frame members secured together by four assembly devices shown in FIG. 1 to hold a piece of glass.

Referring now to FIG. 13, a frame 138 is shown. By "frame" it is meant a structure for supporting or enclosing something else, especially the skeletal support of a physical construction. The frame 138 encloses a pane or piece of glass 140. The pane of glass 140 could be replaced by a pane or piece of Plexiglas, a sheet of acrylic, a transparent material or a non-transparent material. The frame 138 includes four hollow frame members 12, 12, 12 and 12 arranged as a square and joined at the ends thereof by four assembly devices 10, 10, 10 and 10. The four assembly devices 10, 10, 10 and 10 create the corners of the frame 138. In order to construct the frame 138, the combination of first and second hollow frame members 12, and 12 are joined by a single assembly device 10. The first hollow frame member 12 has a top wall 14, a bottom wall 16 and a pair of side walls 18 and 20 joined to the top and bottom walls, 14 and 16 respectively. The first hollow frame member 12 has an inner periphery 22 with a plurality of ribs 24 longitudinally formed therein. The first hollow frame member 12 also has a channel 26 projecting upward from the top wall 14. The channel 26 has an open top surface 32 and open ends 34 and 36.

The second hollow frame member 12 has a top wall 14, a bottom wall 16 and a pair of side walls 18 and 20 joined to the top and bottom walls, 14 and 16 respectively. The second hollow frame member 12 has an inner periphery 22 with a plurality of ribs 24 longitudinally formed therein. The second hollow frame member 12 also has a channel 26 projecting upward from the top wall 14. The channel 26 has an open top surface 32 and open ends 34 and 36.

As shown in FIG. 12, the assembly device 10' also includes a second hollow coupling member 88 having a pair of sidewalls 90 and 92 formed integral with and projecting out from one of the four sidewalls 42, 44, 46 and 48 of the hollow base member 38. The pair of sidewalls 90 and 92 terminates at an end wall 94. The second hollow coupling member 88 has a transverse partition 96 aligned parallel with the end wall 94 and integral with and connecting mid-portions of the pair of sidewalls 90 and 92. The pair of sidewalls 90 and 92 extend to and terminate in parallel planes which are normal (at 90 degrees) to the sidewall 44 of the hollow base member 38. The transverse partition 96 creates cavities 98 into which an expandable adhesive 73 can be placed. The expandable adhesive 73 will contact the inner periphery 22 of the second hollow frame member 12 and hold the second hollow frame member 12 secure to the assembly device 10'.

By securing four of the assembly devices 10, 10, 10 and 10 to four hollow frame members 12, 12, 12 and 12, the frame 138 can be constructed. The channels 104, 104, 104 and 104, shown in FIGS. 1, 7 and 9, will secure the pane or piece of glass 140 to the frame 138.

It should be understood that the pane or piece of glass, Plexiglas, a sheet of acrylic, or some other material can be secured to the assembly device 10 and to the first and second hollow frame members 12 and 12. A second assembly device 10 can then be secured to the opposite ends of the first and second hollow frame members 12, 12. Then a fourth assembly device 10 is secured to third and fourth hollow frame members 12, 12. The third and fourth hollow frame members, 12 and 12 can then be secured to the second and third assembly devices 10 and 10 to complete the frame 138 and completely enclose the pane or piece of glass, Plexiglas, a sheet of acrylic, a transparent material or a non-transparent material.

Figure 14:
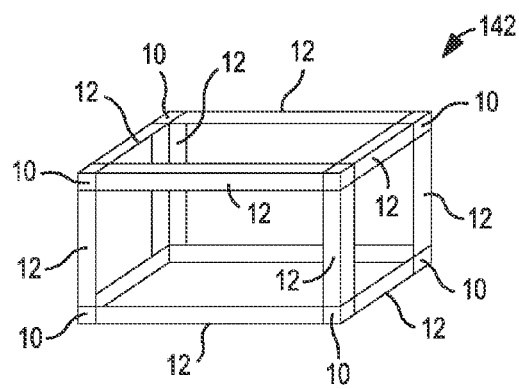
FIG. 14 is an aquarium formed from several assembly devices shown in FIG. 12 to secure several hollow frame members together.

Referring now to FIG. 14, an aquarium 142 is shown. By "aquarium" it is meant a water filled enclosure in which fish or other aquatic animals and plants are kept. The aquarium 142 is formed by securing several hollow frame members 12 together by several assembly devices 10'. In FIG. 14, eight assembly devices 10' are used to secure twelve hollow frame members 12 together to form a rectangular structure.

It should be understood that the length of each of the hollow frame members 12 can vary. All of the hollow frame members 12 do not have to be the same length.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An assembly device for attaching first and second hollow frame members together, comprising:
 a) a hollow base member having a top wall, four sidewalls joined to said top wall, and having an open bottom surface, said hollow base member having a height and having a hollow tube positioned therein and extending parallel to said height, said hollow tube having an open bottom surface, and said hollow tube is secured to at least one of said four sidewalls by a connecting member;
 b) a first hollow coupling member projecting upward from said top wall of said hollow base member and being integrally formed therewith, said first hollow coupling member having four sidewalls substantially coincident with said four sidewalls of said hollow base member, said four sidewalls creating a hollow core in said first hollow coupling member which has an open upper end, at least one of said four sidewalls of said first hollow coupling member has a longitudinal groove formed therethrough and said longitudinal groove is aligned parallel to said height of said hollow base member and terminates at said open upper end, said longitudinal groove allowing an expandable adhesive placed in said hollow core to pass therethrough and contact an inner periphery of said first hollow frame member once said first hollow frame member is slid onto said first hollow coupling member, and said expandable adhesive will hold said first hollow frame member secure to said assembly device; and
 c) a second hollow coupling member having a pair a sidewalls formed integral with and projecting out from one of said four sidewalls of said hollow base member, said pair of sidewalls terminating at an end wall, said second hollow coupling member having a transverse partition aligned parallel with said end wall and integral with and connecting mid-portions of said pair of sidewalls, said pair of sidewalls extending to and terminating in parallel planes which are normal to said sidewall of said hollow base member, and said transverse partition creating cavities into which an expandable adhesive can be placed and which can contact an inner periphery of said second hollow frame member and hold said second hollow frame member secure to said assembly device.

2. The assembly device of claim 1 wherein said first hollow coupling member is square-shaped, and said open bottom surface of said hollow tube is sized to receive a stud connected to a bracket which has a wheel secured thereto.

3. The assembly device of claim 1 wherein said top wall of said hollow base member also functions as a bottom wall of said hollow core.

4. The assembly device of claim 1 further comprising a vertical partition positioned in said hollow core which is aligned parallel to said sidewall which contains said longitudinal groove.

5. The assembly device of claim 1 wherein said first hollow coupling member has a height which is less than the height of said hollow base member.

6. The assembly device of claim 1 wherein said hollow base member has an outer periphery and said first hollow coupling member has an outer periphery, and said outer periphery of said hollow base member is larger than said outer periphery of said first hollow coupling member.

7. The assembly device of claim 1 wherein said longitudinal groove has a length which is less than about half of the height of said first hollow coupling member.

8. The assembly device of claim 1 wherein two opposing sidewalls of said first hollow coupling member each have a longitudinal groove formed therein, and each of said longitudinal grooves has a length which is equal to less than about half of the height of said first hollow coupling member.

9. The assembly device of claim 1 wherein an anchor is inserted into said hollow tube to anchor said assembly device to a stationary object.

10. An assembly device for securing first and second hollow frame members together, comprising:
 a) a hollow base member having a top wall, four sidewalls joined to said top wall, and having an open bottom surface, said hollow base member having a height and having a hollow tube positioned therein which extends parallel to said height, said hollow tube having an open bottom surface, and said hollow tube being secured to at least one of said four sidewalls by a connecting member;
 b) a first hollow coupling member projecting upward from said top wall of said hollow base member and being integrally formed therewith, said first hollow coupling member having four sidewalls substantially coincident with said four sidewalls of said hollow base member, said four sidewalls creating a hollow core in said first hollow coupling member which has an open upper end, at least one of said four sidewalls of said first hollow coupling member having a longitudinal groove formed therethrough and said longitudinal groove is aligned parallel to said height of said hollow base member and terminates at said open upper end, said longitudinal groove allowing an expandable adhesive placed in said hollow core to pass therethrough and contact an inner periphery of said first hollow frame member and hold said first hollow frame member secure to said assembly device; and
 c) a second hollow coupling member having a pair a sidewalls formed integral with and projecting out from one of said four sidewalls of said hollow base member, said pair of sidewalls terminating at an end wall, said second hollow coupling member having a transverse partition aligned parallel with said end wall and integral with and connecting mid-portions of said pair of sidewalls, said pair of sidewalls extending to and terminating in parallel planes which are normal to said sidewall of said hollow base member, and said transverse partition creating cavities into which an expandable adhesive can be placed and which can contact an inner periphery of said second hollow frame member and hold said second hollow frame member secure to said assembly device.

11. The assembly device of claim 10 further comprising a vertical partition positioned in said hollow core which is aligned parallel to said sidewall which contains said longitudinal groove.

12. The assembly device of claim 10 further comprising a third hollow coupling member having a pair a sidewalls formed integral with and projecting out from a second of said four sidewalls of said hollow base member, said pair of sidewalls terminating at an end wall, said third hollow coupling member having a transverse partition aligned parallel with said end wall and integral with and connecting mid-portions of said pair of sidewalls, said pair of sidewalls extending to and terminating in parallel planes which are normal to said second sidewall of said hollow base member, and said transverse partition creating cavities into which an expandable adhesive can be placed and which can contact an inner periphery of a third hollow frame member and hold said third hollow frame member secure to said assembly device.

13. The assembly device of claim 12 wherein said third hollow coupling member is aligned perpendicular to said first and second hollow coupling members and lies in the same horizontal plane as said second hollow coupling member.

14. The assembly device of claim 10 wherein said hollow base member has a stepped configuration located between said open bottom surface and said top wall, and a channel is integrally formed on said stepped configuration of said hollow base member, said channel including a pair of parallel walls, one of said parallel walls being an extension of one of said four sidewalls and the other of said parallel walls being spaced apart therefrom, said channel having an open top surface and an open end facing away from said hollow base member, and said channel receiving and holding a piece of glass.

15. The assembly device of claim 14 wherein said piece of glass is Plexiglas.

16. The assembly device of claim 14 wherein a sealing material is inserted into said channel to secure said piece of glass.

17. The assembly device of claim 15 wherein said channel has a width measured perpendicular to said stepped configuration, and said width is equal to about half of the width of said adjacent sidewall of said hollow base member.

18. A combination of first and second hollow frame members and an assembly device, comprising:
   a) a first hollow frame member having a top wall, a bottom wall and a pair of side walls joined to said top and bottom walls, said first hollow frame member having an inner periphery, and having a channel projecting upward from said top wall, said channel having an open top surface and open ends;
   b) a second hollow frame member having a top wall, a bottom wall and a pair of side walls joined to said top and bottom walls, said second hollow frame member having an inner periphery, and having a channel projecting upward from said top wall, said channel having an open top surface and open ends; and
   c) an assembly device for securing said first and second hollow frame members together, said assembly device including a hollow base member having a top wall, four sidewalls joined to said top wall, and having an open bottom surface, said hollow base member having a height and having a hollow tube positioned therein which extends parallel to said height, said hollow tube being secured to at least one of said four sidewalls by a connecting member, and said hollow tube having an open bottom surface, a first hollow coupling member projecting upward from said top wall of said hollow base member and being integrally formed therewith, said first hollow coupling member having four sidewalls substantially coincident with said four sidewalls of said hollow base member, said four sidewalls creating a hollow core in said first hollow coupling member which has an open upper end, at least one of said four sidewalls of said first hollow coupling member having a longitudinal groove formed therethrough and said longitudinal groove is aligned parallel to said height of said hollow base member and terminates at said open upper end, said longitudinal groove allowing an expandable adhesive placed in said hollow core to pass therethrough and contact said inner periphery of said first hollow frame member once said first hollow frame member is slid onto said first hollow coupling member and hold said first hollow frame member secure to said assembly device, a second hollow coupling member having a pair of sidewalls formed integral with and projecting out from one of said four sidewalls of said hollow base member, said pair of sidewalls terminating at an end wall, said second hollow coupling member having a transverse partition aligned parallel with said end wall and integral with and connecting mid-portions of said pair of sidewalls, said pair of sidewalls extending to and terminating in parallel planes which are normal to said sidewall of said hollow base member, and said transverse partition creating cavities into which an expandable adhesive can be placed and which can contact said inner periphery of said second hollow frame member and hold said second hollow frame member secure to said assembly device.

19. The combination of claim 18 further comprising securing a piece of glass to said first and second frame members.

20. The combination of claim 18 further comprising securing a piece of Plexiglas to said first and second frame members.

* * * * *